United States Patent [19]
Engels

[11] 3,884,313
[45] May 20, 1975

[54] CONTINUOUSLY OPERATING MEASURING DEVICE FOR POURABLE MATERIALS

[75] Inventor: Kaspar Engels, Mannheim, Germany

[73] Assignee: Draiswerke GmbH, Mannheim, Germany

[22] Filed: Mar. 11, 1974

[21] Appl. No.: 450,176

[30] Foreign Application Priority Data
Mar. 10, 1973  Germany............................ 2312129

[52] U.S. Cl................................. 177/119; 177/116
[51] Int. Cl.............................................. G01g 13/02
[58] Field of Search ........................ 177/116–123, 177/16; 198/171; 222/55, 345, 371, 408, 415

[56] References Cited
UNITED STATES PATENTS

| | | | |
|---|---|---|---|
| 1,717,564 | 6/1929 | Ihlefeldt............................ | 177/119 |
| 2,011,608 | 8/1931 | Belknap............................ | 177/119 |
| 2,095,509 | 10/1937 | Merchen........................... | 177/122 |
| 2,293,554 | 8/1942 | May................................... | 198/171 |
| 2,373,838 | 4/1945 | Lindholm......................... | 177/120 |
| 3,052,343 | 9/1962 | Schreter........................... | 198/171 |
| 3,679,010 | 7/1972 | Bullivant.......................... | 177/121 |
| 3,786,961 | 1/1973 | Wahl................................. | 177/121 |
| 3,788,368 | 1/1974 | Geng................................. | 177/122 |

FOREIGN PATENTS OR APPLICATIONS
232,416  3/1910  Germany .......................... 177/119

Primary Examiner—Joseph W. Hartary
Assistant Examiner—Vit W. Miska
Attorney, Agent, or Firm—Browdy & Neimark

[57] ABSTRACT

A feeding and measuring device for flowable solid materials includes endless chains running over chain wheels, such chains being provided with entrainment means for pushing the material along the bottom of the housing and resting on the latter. In this device, the material is pushed or pulled through the housing without rolling, so that errors due to uncontrollable dwell times of the material in the housing cannot develop. Since the entrainment devices lie flat on the bottom and can be moved along the wall of the housing with only a small amount of play, practically no uncontrolled dust or dirt accumulation can occur in the area of the feed cross-section.

10 Claims, 6 Drawing Figures

CONTINUOUSLY OPERATING MEASURING DEVICE FOR POURABLE MATERIALS

FIELD OF THE INVENTION

The invention concerns a continuously operating measuring device for pourable materials, including an enclosed housing containing a circulating, driven feed device transporting the material from an inlet opening to an outlet opening, and a weighing device which supports the housing.

BACKGROUND OF THE INVENTION

In devices of this general type, e.g., such as is known from Swiss Pat. No. 362,542, a feed screw is mounted in a tubular housing, such screw feeding the material to be supplied from an inlet funnel to a material outlet. This device is swivelably mounted in the area of the material inlet opening on a knife edge, and suspended at the other end by a weighing device. With this known device, dusty or aggressive or poisonous or other dangerous materials, usually in small amounts, can be transported with simultaneous weight measurement.

However, the disadvantage of this known device consists in the fact that, especially in the case of non-fluid materials, the device has a completely uncontrollable material flow which allows no exact measurement in the sense of technological readings. In the case of many materials without adequate fluidity, as for example fibers and chips, the material will simply be rolled around in the screw so that the r.p.m. of the screw is not a measure of the feed performance. In addition, significant errors are produced by the space between the side of the screw and the internal wall of the housing, where dust and contaminants can settle, but which varies in size, depending on whether the screw is running empty or is under load. A determination of the weight of this measuring device formed by the screw in the empty state, therefore, does not provide a value suitable for calibration.

Moreover, such feed screws, even when feeding liquid material, can be operated only with partial filling of a third of their cross section, since otherwise the danger of blockage will be great. The volume efficiency of such devices is therefore relatively poor.

For the continuous measurement of such light, dusty and possibly aggressive or poisonous materials, but preferably chip and fiber-containing materials that are not liquid and tend to produce blockage, it is already known to use so-called belt scales. In these devices, flat belts are mounted on a frame, which in turn is suspended over a weighing device. The disadvantage of this known device is that it does not allow any direct sealing with respect to the environment, and a separation between the actual weighing devices and the dusty material-receiving room is not possible.

Aside from environmental polution and the threat to the environment due to escape of the material to be measured, these belt scales are prone to considerable measurement errors due to uncontrollable accumulation of dust on the machine parts which are weighed. Conventional belt scales can accept an amount of material equal to 3 to 5 kg on the belt. If the dust or dirt accumulation on the machine parts of the belt scale is only 300 to 500 gm., this is already an error of 10 percent. Furthermore, fluidized or "shooting" or air entrained solids cannot be conveyed by such belt scales.

SUMMARY OF THE INVENTION

The purpose of the present invention, therefore, is to construct a device of the type initially described in such form that, by avoiding such uncontrollable measurement errors as rolling of the material, uncontrollable dust components and the like, non-fluid materials, especially dust and chips, can be fed through the measuring device. Accordingly, it is an object of the present invention to overcome the deficiencies of the prior art, such as indicated above; and it is another object to provide for improved continuous measurement of flowable materials.

The above purpose is solved in accordance with the invention by having as a feed device, endless chains running over chain wheels, such chains being provided with entrainment means for pushing the material along the bottom of the housing and resting on the latter. In this device, the material is pushed or pulled through the housing without rolling, so that errors due to uncontrollable dwell times of the material in the housing cannot develop. Since the entrainment devices lie flat on the bottom and can be moved along the wall of the housing with only a small amount of play, practically no uncontrolled dust or dirt accumulation can occur in the area of the feed cross section.

Of course, the contamination that does occur does not change within a short time due to the brief operating period, so that no uncontrollable errors can develop. Moreover, since it is possible in such a device to increase the weight capacity significantly rather easily, relative errors are reduced considerably in contrast to belt scales and feed screws. In the case of non-fluid material, the total filling cross section is drawn along by the entrainment devices. In fluidized products it is advantageous if the filling is not higher than the entrainment device.

In an improved embodiment, an intermediate partition is provided in the housing, over which the upper stringer of each chain runs, so that the material is first pushed over this partition and only then over the housing bottom.

DETAILED DESCRIPTION OF EMBODIMENTS

Further advantages and features of the invention follow from the description of sample embodiments illustrated by the drawing.

FIG. 1 substantially shows an embodiment of the invention in a vertical length-wise section, with an elongated rectangular housing, circulating chains and transport of the material along the bottom of the housing;

DETAILED DESCRIPTION

Figure 1:
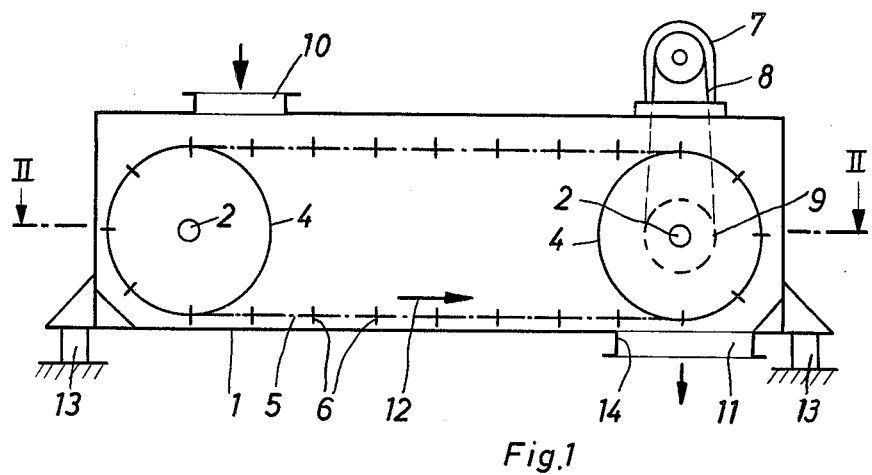
Figure 2:
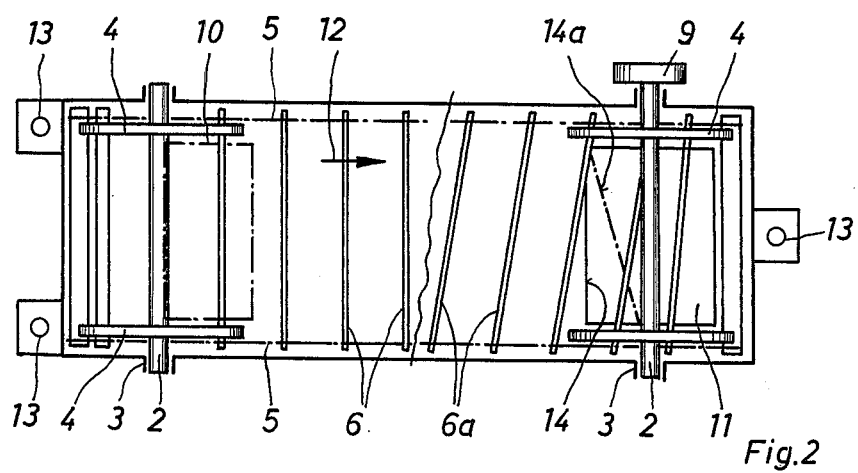
FIG. 2 shows a horizontal cross-section through the device, of FIG. 1 along section line II—II in FIG. 1.

In FIGS. 1 and 2, a device is shown which constitutes a sample embodiment according to the invention, with an elongated housing 1 having a rectangular cross-section. In the area of the two ends of housing 1, rollers 2 are mounted in bearings 3, said bearings being mounted in or on the side walls of the housing 1. Two chain wheels 4 are each mounted on these mutually parallel rollers 2. A chain 5 is led over each two chain wheels 4, aligned with each other. The housing 1 is supported on a 3-point mounting over three pressure sensors 13. Instead of these sensors, any other weighing-technical measuring device, many of which are commonly known, may be employed, the purpose of which will be discussed in further detail below.

Entrainment devices or scrapers 6 are mounted on the two mutually parallel chains 5, extending almost entirely across the width of housing 1, such entrainment devices or scrapers preferably consisting of elongated, somewhat rectangular, rigid steel sheets. The entrainment devices or scrapers rest on the bottom of the housing and have only a slight amount of lateral play with respect to the walls of the housing.

The circulating chains 5 are driven by a drive motor 7 mounted on the outside of the housing, such motor acting on a rim or chain wheel 9 on a shaft 2 through a rim or chain drive 8. A material input funnel 10 is mounted on the cover of housing 1 in the vicinity of one end of the housing, and a material outlet funnel 11 is provided at the opposite end of housing 1 on the lower side of the latter. The material which is fed into the housing through the material input funnel 10 is transported by feed device 12 having chains 5 and entrainment devices and/or scrapers 6 across the bottom of the housing 1 to the material outlet funnel 11.

As can be seen from FIG. 2, the entrainment devices or scrapers 6 may be mounted perpendicular to feed device 12 (FIG. 2, left side) or may be mounted diagonally with respect to it (FIG. 2, right side). These diagonally mounted entrainment devices or scrapers 6a form an angle with the overflow edge 14 of the material outlet funnel, so that the expulsion of the material takes place in succession in the event of a partial filling. Instead of a diagonal mounting of the entrainment devices or scrapers 6a, the overflow edge 14a of the material outlet funnel 11 can be mounted diagonally with respect to the feed or transport device 12.

Figure 3:
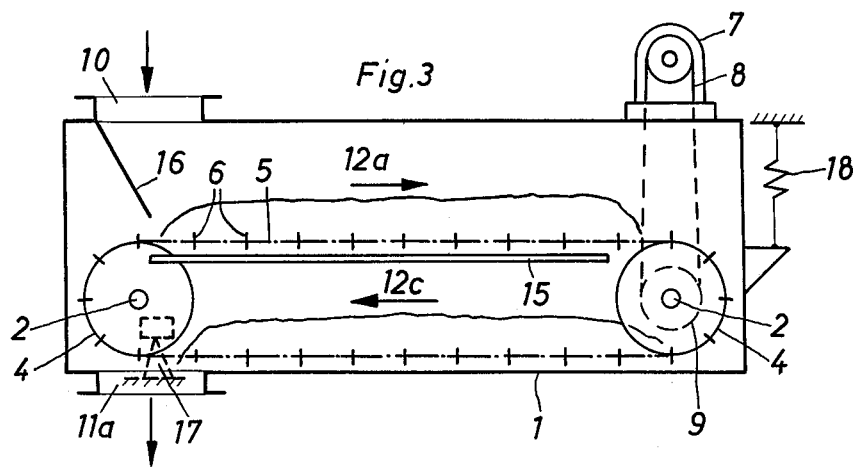
FIG. 3 shows a modified embodiment of the invention in a vertical length-wise section.

FIG. 3 shows a modified form of the embodiment in which the same parts have the same reference numbers. In this embodiment, housing 1 contains a partition 15, above which the upper stringers of chains 5 and therefore the entrainment devices or scrapers 6 run. The flowable solid material, falling through material inlet funnel 10 and through a guide baffle 16 of sheet metal or the like onto this partition 15, is picked up by the entrainment devices or scrapers 6 and moved in the direction of transport arrow 12a. As shown at the right in FIG. 3, the material then falls at the end of partition 15 onto the bottom of housing 1, where it is once again picked up by the entrainment devices or scrapers 6 and conveyed in the opposite direction according to arrow 12c to the material outlet funnel 11a, from which it can then be dispensed.

Material inlet funnel 10 and material outlet funnel 11a are located roughly one above the other. Housing 1 is mounted at the left-hand end, as shown in FIG. 3, on blades 17. These blades 17 are advantageously located, as shown in FIG. 3, on the lateral lengthwise walls of housing 1, in fact, diagonally with respect to the direction of transport 12a, in the middle of the material inlet funnel 10. Instead of being mounted on a blade 17, the suspension can also be supported by means of a steel band. Housing 1 is suspended at the end opposite blade 17 on a tension-measuring device 18 as a weighing-technical measuring device.

Figure 4:
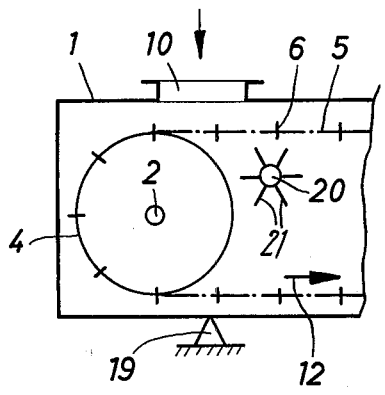
FIG. 4 shows a modified embodiment similar to FIGS. 1 and 2 in a partial lengthwise section.

FIG. 4 shows a modified form of the device similar to FIGS. 1 and 2, and only the material input side, i.e., the left-hand side shown in FIGS. 1 and 2, is represented, where the same reference numbers are used for the same parts once again. In this case, the housing 1 is not mounted in the area shown on two pressure-sensing devices 13, as in FIG. 1, but on a knife edge 19, which supports the housing in the middle beneath the material input funnel 10. This arrangement allows a relatively uniform feed of the material to be measured. The energies or momenta of the material falling into the housing in this arrangement do not enter into the measurement as errors. Basically, one can allow a nonuniformly fed product to run through the device according to the invention and integrate the results correspondingly.

However, it is recommended that a certain equalization be ensured. For this purpose, a shaft 20 is provided, at right angles to the transport direction 12 beneath the inlet funnel, mounted in the side wall of the housing and driven by a motor (not shown); this shaft is provided with rows of pins or paddles or flanges 21 or distributing screw segments. Distributing screw segments also have the advantage of allowing utilization of the total available area across their width in the event of central feed of the material. This is particularly advantageous for very light products, in order to be able to introduce a sufficient amount of material into the measurement.

Such equalizing devices in every case have the advantage that the lengthwise cross section of the flow of material located in the housing is smoothed, so that no brief excess variation of the weight indicator results and regulation can be ensured. Such variations would otherwise be frequently unavoidable, since the feed devices from bunkers connected ahead of such a measuring device do not always operate absolutely continuously or uniformly.

Figure 5:
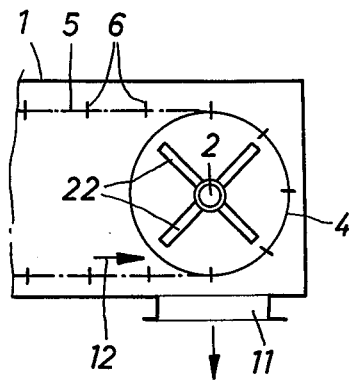
FIG. 5 shows a modified embodiment similar to FIGS. 1 and 2 in partial lengthwise section.

In FIG. 5, there is shown a device similar to FIGS. 1 and 2 in which the shaft 2 associated with the material outlet funnel 11 also has a row of pins 22 which ensure that material which is not fluidized or only poorly fluidized can be pressed through the space between the entrainment devices or scrapers 6 to the outlet funnel 11.

In all of the sample embodiments shown in FIGS. 1 through 5, it may be advantageous to form the inlet end region of the housing in the shape of a segment of a cylinder, so that the entrainment devices or scrapers can be pulled from the plane spanned by shaft 2 along this shape on their way downward, so that the formation of dead spaces at the end region of the housing is avoided.

Measuring devices of the form described herein are suitable, with a constant propulsion rate of the entrainment devices 6, for the control of other dispensing elements for solid/liquid substances as a function of the indicated weight. Hence, the weight indicated by the weighing technological measuring device changes as a function of the variations of the amount of material fed to the present device. Therefore, such a dispensing element, for example a glue pump, is controlled in proportion to the weight indicated by the weighing-technical measuring device. Furthermore, it is possible with a constant propulsion rate of entrainment devices 6 and a constant performance of one or more dispensing elements, for example glue pumps, to control a feed bunker located ahead of the present device with a fine degree of accuracy according to the weight indications of the weighing technical measuring device, but this is relatively difficult.

Furthermore, it is possible, with a variable material feed to the present device, to keep the total weight indicated by the weighing-technical measuring device constant as follows, namely, the feed rate of entrainment devices is controlled by deviations in a pre-set weight value and simultaneously the delivery from one or more dispensing elements is controlled in proportion to the feed rate. This involves a direct mechanical or electrical rigid coupling of chain wheels or a star wheel on the one hand and dispensing pumps on the other. They are suitable, however, even with constant weight and appropriate adjustment of the feed rate to the through-put power, for controlling other measuring devices, especially direct mechanically or electrically rigid drive of dispensing pumps.

Figure 6:
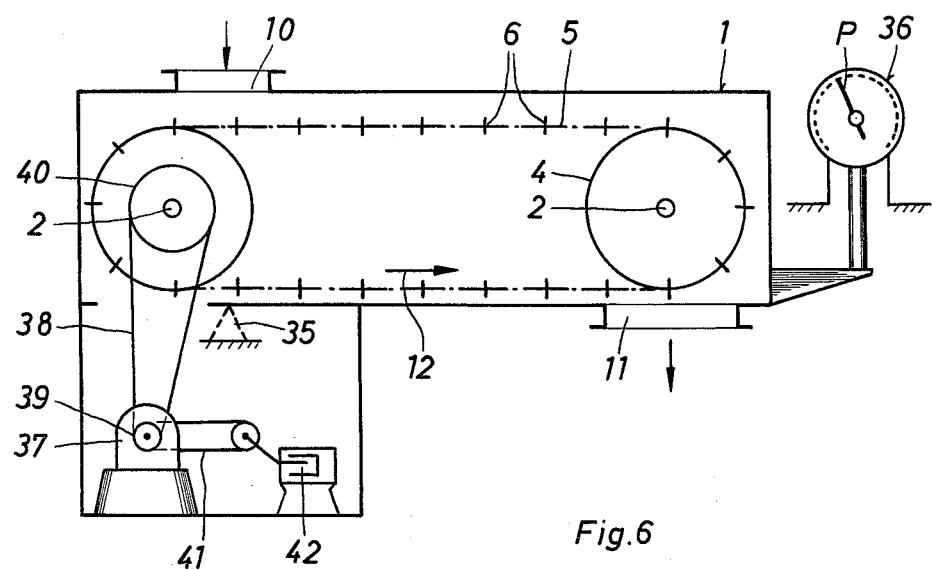
FIG. 6 shows a device similar to FIGS. 1 and 2, combined with a fluid-dispensing device.

FIG. 6 shows such an arrangement with a rigid drive of a piston dispensing pump in schematic form. The housing 1 which is mounted on a knife edge 35 beneath material inlet funnel 10 is suspended at its other end by a weighing device 36. This weighing device is intended to show constantly a fixed load P. When a selected ideal load P is exceeded or there is a shortfall, the rate of travel of chain 5 with entrainment devices 6 is correspondingly increased or decreased, the chain 5 being driven by a variable-speed motor 37 which is controlled in accordance with the deviations of weighing device 36 from the desired value P. Thus, variable-speed motor 37 drives a corresponding shaft 2 through a chain 38 and chain wheels 39, 40, so that in this case the upper stringer of the chain is under tension. The variable-speed motor 37 also drives a fluid pump 42 directly through a chain 41, for example, a dispensing piston pump.

Such a device according to the present invention advantageously has a mixer connected ahead of it, as is known for example from German patent applications P 20 57 594.4-23 and P 21 13 960.6-23 referred to for priority in U.S. Pat. No. 3,734,471. With the device according to the present invention, it is possible to have an adjustment of the fluids later to bed fed into the mixer with the solids, i.e., for example, a dispensing of glue to amounts of chips, even in the case of briefly varying the amounts of chips.

When the amount of material fed into the device according to the invention increases, the total weight of this device, i.e., the value of the weight acting on this weighing device measured by weighing device 36, is exceeded. The result is that the r.p.m. of the variable-speed motor 37 is increased, so that a larger amount of material per unit time is fed to the outlet funnel 11 by chain 5, i.e., its entrainment devices or scrapers 6. In other words, in this case, a larger flow per unit time into the mixer connected beyond the feeding device is ensured. However, since the r.p.m. of variable-speed motor 37 has been increased, the dispensing performance of fluid pump 42 simultaneously increases, so that at the same time a proportionally increased amount of fluid is fed to the mixer beyond the feed device.

The ratio of the material flow to the amount of fluid per unit time therefore remains roughly constant independent of the time variations of the material flow. In the embodiment shown in FIG. 6 it should be observed that the adjustable motor 37 and the fluid dispensing pump 42 are likewise included in housing 1 so that variations in the reactional moment of the motor cannot show up as variations in the reading of the weighing technical measuring device 36.

Of course, it is possible to include in various systems a measuring device for the desired performance of the glue pump. Furthermore, it is possible in the sample embodiments of FIGS. 1 through 6 to suspend the scrapers or entrainment devices 6 so that they hang and are located a distance apart which is equivalent to their height on chains 5, so that they form a closed surface as they are pulled across the bottom of the housing.

It will be obvious to those skilled in the art that various changes may be made without departing from the scope of the invention and the invention is not to be considered limited to what is shown in the drawings and described in the specification.

I claim:

1. In a continuously operating measuring device for pourable materials, comprising: a closed housing having a material inlet and a material outlet; a circulating, driven feed device located within said housing for transporting material through said housing, from said material inlet opening to said material outlet opening; and a weighing device which supports the housing, the improvement wherein:

said driven feed device comprises a plurality of chain wheels, endless chains supported by said chain wheels, and entrainment means to push the material across the bottom of the housing, said entrainment means being supported by said chains and driven thereby and said entrainment means extend from said chains and slidably engage said bottom of said housing.

2. Device according to claim 1, characterized by a horizontal partition being provided in said housing, above which the upper course of each chain runs.

3. Device according to claim 1 wherein the outlet opening is rectangular with an overflow edge perpendicular to the length of said housing and the scrapers or entrainment devices are arranged at an angle to the overflow edge of the material outlet opening.

4. Device according to claim 1, characterized by an equalizing device being provided in housing in the area of the material inlet opening.

5. Device according to claim 1, characterized by expulsion means above the material outlet opening to promote the expulsion of the material.

6. Device according to claim 1, characterized by the housing being supported with its entire weight on a weighing device.

7. Device according to claim 1, characterized by the housing being swivelably mounted in the area of the material inlet opening and supported in the area of the opposite end by a weighing device.

8. Device according to claim 2, characterized by the material inlet opening and the material outlet opening being mounted approximately one above the other.

9. Device according to claim 4, characterized by a rotating cross-distributing device being provided as an equalizing device.

10. Device according to claim 5, characterized by said expulsion means being provided above the material outlet opening on a shaft of the corresponding chain wheel.

* * * * *